(12) United States Patent
Xu et al.

(10) Patent No.: US 11,215,534 B2
(45) Date of Patent: Jan. 4, 2022

(54) WHEEL TESTING MACHINE DETECTS PERFORMANCE THROUGH APPLICATION OF RADIAL THRUST

(71) Applicant: CITIC Dicastal Co., Ltd., Qinhuangdao (CN)

(72) Inventors: Zuo Xu, Qinhuangdao (CN); Weidong Liu, Qinhuangdao (CN); Shiwen Xu, Qinhuangdao (CN); Minglei Li, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 46 days.

(21) Appl. No.: 16/831,751

(22) Filed: Mar. 26, 2020

(65) Prior Publication Data

US 2021/0088414 A1    Mar. 25, 2021

(30) Foreign Application Priority Data

Sep. 25, 2019 (CN) .......................... 201910908169.X

(51) Int. Cl.
*G01M 17/013* (2006.01)

(52) U.S. Cl.
CPC ................................ *G01M 17/013* (2013.01)

(58) Field of Classification Search
CPC .......................... G01M 17/013; G01M 5/0075
See application file for complete search history.

(56) References Cited

U.S. PATENT DOCUMENTS

| | | | | |
|---|---|---|---|---|
| 5,072,611 A | * | 12/1991 | Budd | G01M 13/045 73/115.07 |
| 2010/0031740 A1 | * | 2/2010 | Olex | G01M 17/022 73/146 |
| 2010/0083745 A1 | * | 4/2010 | Schleif | G01M 17/027 73/146 |

\* cited by examiner

*Primary Examiner* — Eric S. McCall
*Assistant Examiner* — Timothy P Graves
(74) *Attorney, Agent, or Firm* — IPro, PLLC

(57) ABSTRACT

The disclosure discloses a wheel testing machine. The wheel testing machine comprises a wheel clamping part and a test detection part, the device can meet the requirements of wheel test detection in use.

1 Claim, 2 Drawing Sheets

WHEEL TESTING MACHINE DETECTS PERFORMANCE THROUGH APPLICATION OF RADIAL THRUST

TECHNICAL FIELD

The disclosure relates to a test device. In particular to a detection device for detecting the performance of a wheel.

BACKGROUND

As an important appearance part and a safety part of an automobile, wheels need to be subjected to various safety detection before leaving a factory, a wheel rigidity detection test is a very important detection item, and the disclosure introduces a wheel performance detection device which can meet the requirement of wheel detection and has the characteristic of high degree of automation.

SUMMARY

The disclosure aims to provide a wheel testing machine.

In order to realize the purpose, the technical scheme of the disclosure is as follows: a wheel testing machine, comprising a rack, a backing plate, linear guide rails A, guide rail sliding seats A, sliding seats, synchronous racks, shaft sleeves, bearings A, rotating shafts, bearing end covers A, positioning rollers, a base, a bearing B, a shaft, a gear, a clamping cylinder, fastening bolts, a detecting shaft, a lock sleeve, a lock seat, a two-way oil cylinder, an oil cylinder seat, a lead screw nut, a servo motor, a ball screw, a guide rail sliding seat B, a linear guide rail B, rotary screwdown cylinders and pressing claws.

The rack, the backing plate, the linear guide rails A, the guide rail sliding seats A, the sliding seats, the synchronous racks, the shaft sleeves, the bearings A, the rotating shafts, the bearing end covers A, the positioning rollers, the base, the bearing B, the shaft, the gear, the clamping cylinder, the rotary screwdown cylinders and the pressing claws form the positioning mechanisms, and two groups of the vertically symmetric positioning mechanisms form a synchronous clamping part.

In the vertically symmetric positioning mechanisms, the linear guide rails A are mounted on the rack through the backing plate, the sliding seats are connected with the linear guide rails A through the guide rail sliding seats A, the shaft sleeves are fixed on the sliding seats, the rotating shafts are mounted on the shaft sleeves through the bearings A and the bearing end covers A, the positioning rollers are mounted at top ends of the rotating shafts, the rotary screwdown cylinders are mounted on the sliding seats, the pressing claws are mounted on the rotary screwdown cylinders, the synchronous racks are mounted on the sliding seats, the base is mounted at a middle position between vertically symmetric positioning mechanisms of the backing plate, the shaft and the bearing B are mounted in the base, the gear is mounted at a top end of the shaft, the synchronous racks in the vertically symmetric positioning mechanisms are simultaneously engaged with the gear, the clamping cylinder is fixedly arranged on the rack, and an output shaft of the clamping cylinder is connected with the sliding seat in the symmetric positioning mechanism at a top end.

The synchronous racks in the vertically symmetrical positioning mechanisms are simultaneously meshed with the gear, and the clamping air cylinder can drive the vertically symmetrical positioning mechanisms to synchronously perform centripetal or centrifugal motion along the linear guide rail A with high precision, so that the high-precision positioning of the wheels is realized.

The rotary screwdown cylinders can drive the pressing claws to rotate degrees and vertically press the wheel downwards, so that the wheel pressing operation is realized.

A test detection part is formed by the fastening bolts, the detecting shaft, the lock sleeve, the lock seat, the two-way oil cylinder, the oil cylinder seat, the lead screw nut, the servo motor, the ball screw, the guide rail sliding seat B and the linear guide rail B. The servo motor, the ball screw and the linear guide rail B are mounted on the rack, an output shaft of the servo motor is connected with the ball screw, the oil cylinder seat is connected with the linear guide rail B through the guide rail sliding seat B, the lead screw nut is mounted on the oil cylinder seat and is engaged with the ball screw, the two-way oil cylinder is mounted on the oil cylinder seat, an output shaft of the two-way oil cylinder is connected with the lock seat, the detecting shaft is fixedly arranged on the lock seat by the lock sleeve, and wheels are fixedly arranged on the detecting shaft by using the fastening bolts; due to engagement of the ball screw and the lead screw nut, the servo motor drives the two-way oil cylinder to horizontally move along the linear guide rail B; and the two-way oil cylinder provides a radial thrust force for the detecting shaft so that the performance of the wheels is detected.

During actual use, the wheel is firstly installed on the detection shaft, then, the synchronous racks in the positioning mechanisms which are symmetrical up and down is simultaneously meshed with the gear, the clamping cylinder can drive the positioning mechanisms which are symmetrical up and down to synchronously move centripetally or centrifugally along the linear guide rail A at high precision, so that the high-precision positioning of the wheel is realized, then, the rotary screwdown cylinders can drive the pressing claw to rotate 90 degrees and vertically press the wheel downwards, and the positioning and clamping work of the wheel is completed. According to the moment specified in the test standard of the test wheel, the steering and the revolution of the servo motor are adjusted, the two-way oil cylinder horizontally moves to a specified position along the linear guide rail B, the lock seat and the lock sleeve lock the detecting shaft, so that the detection preorder work of the wheel is completed, the oil cylinder starts working, continuous and regular phase-changing thrust is provided for the detecting shaft, the moment borne by the wheel in the running process of the wheel is simulated, and finally whether the wheel is qualified or not is judged through the actually measured data of the test.

The disclosure can meet the requirement of wheel test detection in use, and has the characteristics of ideal effect, high efficiency, safe and reliable work, high automation degree and the like.

Figure 1:
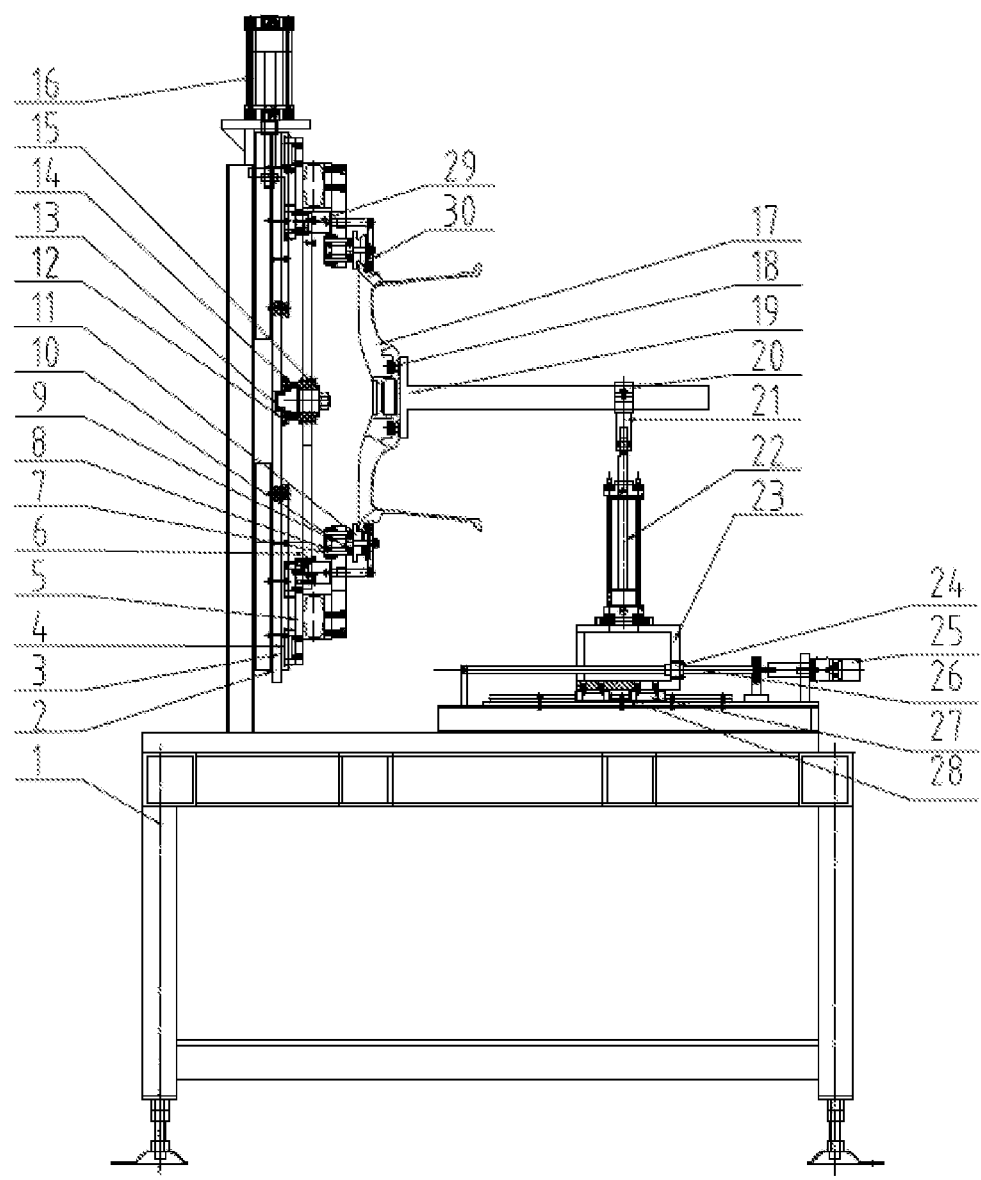
FIG. 1 is a schematic structural view of a wheel testing machine according to the present disclosure.
Figure 2:
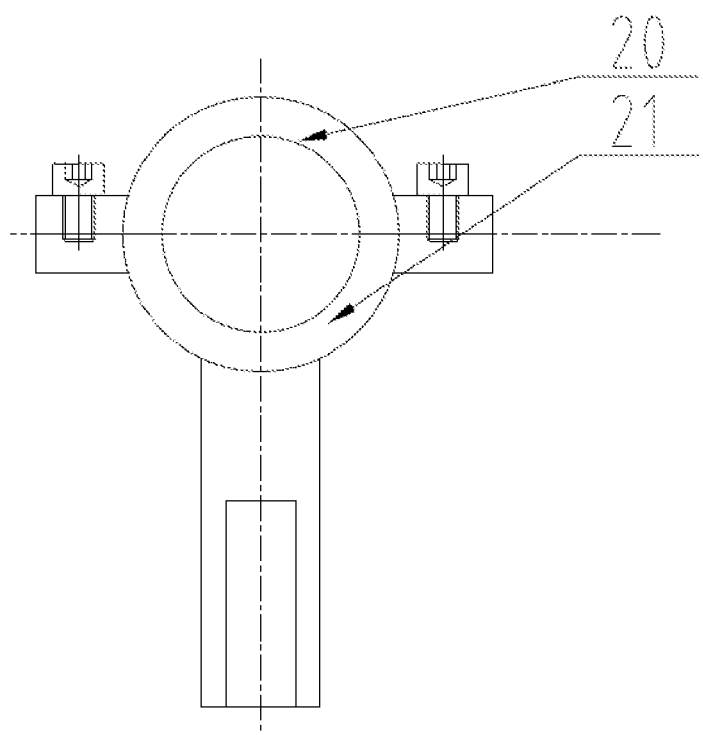
FIG. 2 is a schematic structural diagram of a lock sleeve in the wheel testing machine.

In the figure, 1—a rack, 2—a backing plate, 3—linear guide rails A, 4—guide rail sliding seats A, 5—sliding seats, 6—synchronous racks, 7—shaft sleeves, 8—bearings A, 9—rotating shafts, 10—bearing end covers A, 11—positioning rollers, 12—a base, 13—a bearing B, 14—a shaft, 15—a gear, 16—a clamping cylinder, 17—wheel, 18—fastening bolts, 19—a detecting shaft, 20—a lock sleeve, 21—a lock seat, 22—a two-way oil cylinder, 23—an oil cylinder seat, 24—a lead screw nut, 25—a servo motor, 26—a ball screw, 27—a guide rail sliding seat B, 28—a linear guide rail B, 29—rotary screwdown cylinders, 30—pressing claws.

DETAILED DESCRIPTION

The details and operation of the particular apparatus proposed according to the present disclosure are explained in detail below with reference to the accompanying drawings.

The disclosure relates to a wheel testing machine, which consists of a wheel clamping part and a test detection part, comprises a wheel testing machine, comprising a rack 1, a backing plate 2, linear guide rails A 3, guide rail sliding seats A 4, sliding seats 5, synchronous racks 6, shaft sleeves 7, bearings A 8, rotating shafts 9, bearing end covers A 10, positioning rollers 11, a base 12, a bearing B 13, a shaft 14, a gear 15, a clamping cylinder 16, fastening bolts 18, a detecting shaft 19, a lock sleeve 20, a lock seat 21, a two-way oil cylinder 22, an oil cylinder seat 23, a lead screw nut 24, a servo motor 25, a ball screw 26, a guide rail sliding seat B 27, a linear guide rail B 28, rotary screwdown cylinders 29 and pressing claws 30.

The synchronous clamping part of wheel constitute by the positioning mechanism of longitudinal symmetry, longitudinal symmetry positioning mechanism in, the linear guide rails A 3 are mounted on the rack 1 through the backing plate 2, the sliding seats 5 are connected with the linear guide rails A 3 through the guide rail sliding seats A 4, the shaft sleeves 7 are fixed on the sliding seats 5, the rotating shafts 9 are mounted on the shaft sleeves 11 through the bearings A 8 and the bearing end covers A 10, the positioning rollers 11 are mounted at top ends of the rotating shafts 9, the rotary screwdown cylinders 29 are mounted on the sliding seats 5, the pressing claws 30 are mounted on the rotary screwdown cylinders 29, the synchronous racks 6 are mounted on the sliding seats 5, the base 12 is mounted at a middle position between vertically symmetric positioning mechanisms of the backing plate 2, the shaft 14 and the bearing B 13 are mounted in the base 12, the gear 15 is mounted at a top end of the shaft 14, the synchronous racks 6 in the vertically symmetric positioning mechanisms are simultaneously engaged with the gear 15, the clamping cylinder 16 is fixedly arranged on the rack 1, and an output shaft of the clamping cylinder 16 is connected with the sliding seat 5 in the symmetric positioning mechanism at a top end.

In an aspect of the disclosure, the synchronous racks 6 in the vertically symmetrical positioning mechanisms are simultaneously meshed with the gear 15, and the clamping air cylinder 16 can drive the vertically symmetrical positioning mechanisms to synchronously perform centripetal or centrifugal motion along the linear guide rail A3 with high precision, so that the high-precision positioning of the wheels is realized.

In an aspect of the disclosure, the rotary screwdown cylinders 29 can drive the pressing claws 30 to rotate 90 degrees and vertically press the wheel downwards, so that the wheel pressing operation is realized.

A test detection part is formed by the fastening bolts 18, the detecting shaft 19, the lock sleeve 20, the lock seat 21, the two-way oil cylinder 22, the oil cylinder seat 23, the lead screw nut 24, the servo motor 25, the ball screw 26, the guide rail sliding seat B 27 and the linear guide rail B 28. the servo motor 25, the ball screw 26 and the linear guide rail B 28 are mounted on the rack 1, an output shaft of the servo motor 25 is connected with the ball screw 26, the oil cylinder seat 23 is connected with the linear guide rail B 28 through the guide rail sliding seat B 27, the lead screw nut 24 is mounted on the oil cylinder seat 23 and is engaged with the ball screw 26, the two-way oil cylinder 22 is mounted on the oil cylinder seat 23, an output shaft of the two-way oil cylinder 22 is connected with the lock seat 21, the detecting shaft 19 is fixedly arranged on the lock seat 21 by the lock sleeve 20, and wheels 17 are fixedly arranged on the detecting shaft 19 by using the fastening bolts 18; due to engagement of the ball screw 26 and the lead screw nut 24, the servo motor 25 drives the two-way oil cylinder 22 to horizontally move along the linear guide rail B 28; and the two-way oil cylinder 22 provides a radial thrust force for the detecting shaft 19 so that the performance of the wheels 17 is detected.

During actual use, the wheel is firstly installed on the detection shaft 17, then, the synchronous racks 6 in the positioning mechanisms which are symmetrical up and down is simultaneously meshed with the gear 15, the clamping cylinder 16 can drive the positioning mechanisms which are symmetrical up and down to synchronously move centripetally or centrifugally along the linear guide rail A3 at high precision, so that the high-precision positioning of the wheel 17 is realized, then, the rotary screwdown cylinders 29 can drive the pressing claw 30 to rotate 90 degrees and vertically press the wheel 17 downwards, and the positioning and clamping work of the wheel 17 is completed. According to the moment specified in the test standard of the test wheel, the steering and the revolution of the servo motor 25 are adjusted, the two-way oil cylinder 22 horizontally moves to a specified position along the linear guide rail B28, the lock seat 21 and the lock sleeve 20 lock the detecting shaft 19, so that the detection preorder work of the wheel 17 is completed, the oil cylinder starts working, continuous and regular phase-changing thrust is provided for the detecting shaft 19, the moment borne by the wheel 17 in the running process of the wheel is simulated, and finally whether the wheel 17 is qualified or not is judged through the actually measured data of the test.

What is claimed is:

1. A wheel testing machine, comprising a rack, a backing plate, linear guide rails A, guide rail sliding seats A, sliding seats, synchronous racks, shaft sleeves, bearings A, rotating shafts, bearing end covers A, positioning rollers, a base, a bearing B, a shaft, a gear, a clamping cylinder, fastening bolts, a detecting shaft, a lock sleeve, a lock seat, a two-way oil cylinder, an oil cylinder seat, a lead screw nut, a servo motor, a ball screw, a guide rail sliding seat B, a linear guide rail B, rotary screwdown cylinders and pressing claws, wherein
the linear guide rails A are mounted on the rack through the backing plate, the sliding seats are connected with the linear guide rails A through the guide rail sliding seats A, the shaft sleeves are fixed on the sliding seats, the rotating shafts are mounted on the shaft sleeves through the bearings A and the bearing end covers A, the positioning rollers are mounted at top ends of the rotating shafts, the rotary screwdown cylinders are mounted on the sliding seats, the pressing claws are mounted on the rotary screwdown cylinders, the synchronous racks are mounted on the sliding seats, the base is mounted at a middle position between vertically symmetric positioning mechanisms of the backing plate, the shaft and the bearing B are mounted in the base, the gear is mounted at a top end of the shaft, the synchronous racks in the vertically symmetric positioning mechanisms are simultaneously engaged with the gear, the clamping cylinder is fixedly arranged on the rack, and an output shaft of the clamping cylinder is connected with the sliding seat in the symmetric positioning mechanism at a top end;

the rack, the backing plate, the linear guide rails A, the guide rail sliding seats A, the sliding seats, the synchronous racks, the shaft sleeves, the bearings A, the rotating shafts, the bearing end covers A, the positioning rollers, the base, the bearing B, the shaft, the gear, the clamping cylinder, the rotary screwdown cylinders and the pressing claws form the positioning mechanisms, and two groups of the vertically symmetric positioning mechanisms form a synchronous clamping part;

the servo motor, the ball screw and the linear guide rail B are mounted on the rack, an output shaft of the servo motor is connected with the ball screw, the oil cylinder seat is connected with the linear guide rail B through the guide rail sliding seat B, the lead screw nut is mounted on the oil cylinder seat and is engaged with the ball screw, the two-way oil cylinder is mounted on the oil cylinder seat, an output shaft of the two-way oil cylinder is connected with the lock seat, the detecting shaft is fixedly arranged on the lock seat by the lock sleeve, and wheels are fixedly arranged on the detecting shaft by using the fastening bolts; due to engagement of the ball screw and the lead screw nut, the servo motor drives the two-way oil cylinder to horizontally move along the linear guide rail B; and the two-way oil cylinder provides a radial thrust force for the detecting shaft so that the performance of the wheels is detected; and a test detection part is formed by the fastening bolts, the detecting shaft, the lock sleeve, the lock seat, the two-way oil cylinder, the oil cylinder seat, the lead screw nut, the servo motor, the ball screw, the guide rail sliding seat B and the linear guide rail B.

* * * * *